(12) United States Patent
Kikuchi et al.

(10) Patent No.: US 6,762,709 B2
(45) Date of Patent: Jul. 13, 2004

(54) RADAR SYSTEM, METHOD OF OBTAINING IMAGE, CONTROL METHOD BASED ON IMAGE DATA AND MONITORING METHOD USING MILLIWAVES

(75) Inventors: Takeshi Kikuchi, Tokyo (JP); Hitoshi Nomi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/315,124

(22) Filed: Dec. 10, 2002

(65) Prior Publication Data

US 2003/0117310 A1 Jun. 26, 2003

(30) Foreign Application Priority Data

Dec. 11, 2001 (JP) ........................................ 2001-376722

(51) Int. Cl.[7] .............................................. G01S 7/40
(52) U.S. Cl. ........................ 342/22; 342/174; 342/27; 342/92; 342/179
(58) Field of Search ............................. 342/22, 25, 27, 342/89, 91, 92, 102, 173, 174, 179, 180, 189, 195, 196, 197

(56) References Cited

U.S. PATENT DOCUMENTS

| | | | | |
|---|---|---|---|---|
| 4,521,861 A | * | 6/1985 | Logan et al. ................. | 702/57 |
| 5,455,590 A | * | 10/1995 | Collins et al. ............... | 342/179 |
| 5,512,834 A | * | 4/1996 | McEwan ...................... | 324/642 |
| 5,557,283 A | * | 9/1996 | Sheen et al. ................. | 342/179 |
| 5,805,110 A | * | 9/1998 | McEwan ...................... | 342/387 |
| 6,243,036 B1 | * | 6/2001 | Chadwick et al. ............. | 342/27 |
| 2003/0052684 A1 | * | 3/2003 | Nelson et al. ............... | 324/439 |
| 2003/0117310 A1 | * | 6/2003 | Kikuchi et al. ............... | 342/22 |

FOREIGN PATENT DOCUMENTS

| | | |
|---|---|---|
| JP | 06-331725 | 12/1994 |
| JP | 09-197042 | 7/1997 |
| JP | 10-148673 | 6/1998 |
| JP | 11-083996 | 3/1999 |
| JP | 11-133141 | 5/1999 |
| JP | 2000-101903 | 4/2000 |
| JP | 2001-099930 | 4/2001 |

* cited by examiner

Primary Examiner—John B. Sotomayor
(74) Attorney, Agent, or Firm—Foley & Lardner LLP

(57) ABSTRACT

A plurality of sub-antennas in a two-dimensional plane antenna 11 or the like receive milliwaves from concerned object 20. An A/D converter 12 converts the received signal to digital data. A signal processor 13 executes signal processing on the digital data for displaying images on a monitor 15. Prior to the measurement, a calibration signal source 14 generates a calibration signal. A phase compensator 133 in the signal processor 13 obtains phase compensation data, and compensates measurement data.

17 Claims, 3 Drawing Sheets

RADAR SYSTEM, METHOD OF OBTAINING IMAGE, CONTROL METHOD BASED ON IMAGE DATA AND MONITORING METHOD USING MILLIWAVES

BACKGROUND OF THE INVENTION

This application claims benefit of Japanese Patent Application No. 2001-376722 filed on Dec. 11, 2001, the contents of which are incorporated by the reference.

The present invention relates to radar systems and, more particularly, to radar system having a passive milliwave image receiving function for obtaining image data through receipt of milliwaves from moving or stationary concerned object, as well as related method of obtaining images, control method based on image data and monitoring method using milliwaves.

Person's bodies or the like are generating milliwaves as well as infrared rays, and it is possible to receive such milliwaves by receiving antennas and utilize the received milliwaves for security systems or the like. Specifically, milliwaves can be utilized for detecting guns and other weapons concealed inside the clothing of person passing through a security gate in an air port for getting on board.

Prior art techniques in or related to such a technical field are disclosed in, for instance, Japanese Patent Laid-Open No. 2000-101903 entitled "Image Processing System and Method and Recording Medium" (hereinafter referred to as first prior art), Japanese Patent Laid-Open No. 2001-99930 entitled "Peripheral Monitoring Sensor" (hereinafter referred to as second prior art), Japanese Patent Laid-Open No. 6-331725 entitled "Milliwave Image Pick-Up Device" (hereinafter referred to as third prior art), Japanese Patent Laid-Open No. 9-197042 entitled "Milliwave Camera System" (hereinafter referred to as fourth prior art), Japanese Patent Laid-Open No. 10-148673 entitled "Milliwave Imaging Radar" (hereinafter referred to as fifth prior art), Japanese Patent Laid-Open No. 11-83996 entitled "Milliwave Detection System" (hereinafter referred to as sixth prior art) and Japanese Patent Laid-Open No. 11-13314 entitled "Milliwave Image Forming System" (hereinafter referred to as seventh prior art).

The first prior art discloses an image processing technique capable of easily detection of an IC card attached to the breast of a person from a remote position, thus permitting reduction of image processing efforts for recognizing ID data.

The second prior art discloses a monitoring sensor for peripheral sensing, which can reliably sense relative position, relative speed and shape of an object.

The third prior art discloses a milliwave image pick-up device for reducing the output time after realization of securing high accuracy eyesight image.

The fourth prior art discloses a smaller-size, lighter-weight and less inexpensive milliwave camera system than plane antenna techniques using multiple-layer dielectric substrate.

The fifth prior art discloses a milliwave imaging radar capable of accurate imaging of the shape of the object to be detected by suppressing the phenomenon of "grint" in order to solve the problem that with images, which are obtained as a result of transmission of radio waves from a transmitter and imaging the intensity of radio waves reflected from a measurement object to be detected (such as a gun concealed inside clothing), the measurement object becomes different in shape from the original shape due to the phenomenon called "grint" and can no longer be distinguished from other objects, so that such images can not be applied to the field of security such as weapon detection.

The sixth prior art discloses a milliwave detecting system capable of detecting forbidden items concealed inside clothing by utilizing weak milliwaves not harmful to the person's body.

The seventh prior art discloses a milliwave image forming system based on an FM-CW radar an additional function of judging whether it is in a detection object range by obtaining distance data of an object generated as milliwave images.

SUMMARY OF THE INVENTION

In either of the above prior art techniques, however, with frequency increase minute antenna distortions and errors in connection cable due to temperature or like cause are no longer ignorable to disable obtaining highly accurate images.

Accordingly, it is an object of the present invention to provide radar system capable of suppressing adverse effects of minute antenna distortions and errors in connection cables due to temperature or like cause to enable obtaining highly accurate images, as well as related method of obtaining images, control method based on image data and monitoring method using milliwaves.

It is another object of the present invention to provide a radar system, which uses high frequency waves (i.e., milliwaves) in, for instance, 94-GHz band for obtaining clear motion picture images, as well as related method of obtaining image, control method based on image data and monitoring method using milliwaves.

According to an aspect of the present invention, there is provided radar system for displaying images of a person's body or like concerned object on a monitor or the like by receiving milliwaves emitted from the concerned object comprising: a calibration signal source for generating a milliwave calibration signal at the time of calibration; a receiving antenna having an effectively two-dimensional receiving antenna function; and a signal processor for compensation processing a milliwave received signal from the concerned object received by the receiving antenna based on the calibration signal received by the receiving antenna.

The compensation processing in the signal processor executes phase compensation based on phase relation between the received signal from the concerned object and the calibration signal. The receiving antenna is a two-dimensional plane antenna having a plurality of sub-antennas. The receiving antenna is constituted by two mobile receiving antennas movable in different directions. The radar system further comprises an analog-to-digital converter for converting received signals from the sub-antennas of the effectively two-dimensional receiving antenna in the receiving antenna to digital data, the signal processor including a correlator for obtaining correlations of the digital data and a two-dimensional FFT for executing Fourier transform of the correlations. The the calibration signal has a sufficiently high level compared to milliwaves from the concerned object, the received signals are negligible or attenuated during calibration step.

According to another aspect of the present invention, there is provided a method of obtaining images of person's body or the like concerned object by obtaining image data thereof by receiving milliwaves emitted therefrom, wherein: received milliwave signal from the concerned object received by a receiving antenna is compensation processed on the basis of a predetermined milliwave calibration signal received by the receiving antenna, which effectively has a two-dimensional receiving antenna function, at the time of calibration, thereby obtaining image data of the concerned object.

The compensation processing executes phase compensation based on phase relation between the received signal from the concerned object and the milliwaves calibration signal. The calibration signal has a sufficiently high level compared to milliwaves from the concerned object, the received signal or signals being negligible or attenuated at the time of the calibration.

According to other aspect of the present invention, there is provided a control method comprising the steps of: compensation processing a milliwave received signal emitted from concerned object and received by a receiving antenna, which effectively has a two-dimensional receiving antenna function, based on a predetermined milliwave calibration signal received at the time of calibration, thereby obtaining image data of the concerned object; and executing predetermined control according to the obtained image data.

The calibration signal has a sufficiently high level compared to milliwaves from the concerned object, the received signal or signals being negligible or attenuated at the time of the calibration.

According to further aspect of the present invention, there is provided a method for monitoring object using milliwaves, wherein received milliwave signal from the concerned object received by a receiving antenna is compensation processed on the basis of a predetermined milliwave calibration signal received by the receiving antenna, which effectively has a two-dimensional receiving antenna function, at the time of calibration, to obtain image data of the concerned object, and the object is monitored based on the obtained image data.

The calibration signal has a sufficiently high level compared to milliwaves from the concerned object, the received signal or signals being negligible or attenuated at the time of the calibration. The concerned object is a person's body.

Other objects and features will be clarified from the following description with reference to attached drawings.

PREFERRED EMBODIMENTS OF THE INVENTION

Preferred embodiments of the present invention will now be described with reference to the drawings.

Figure 1:
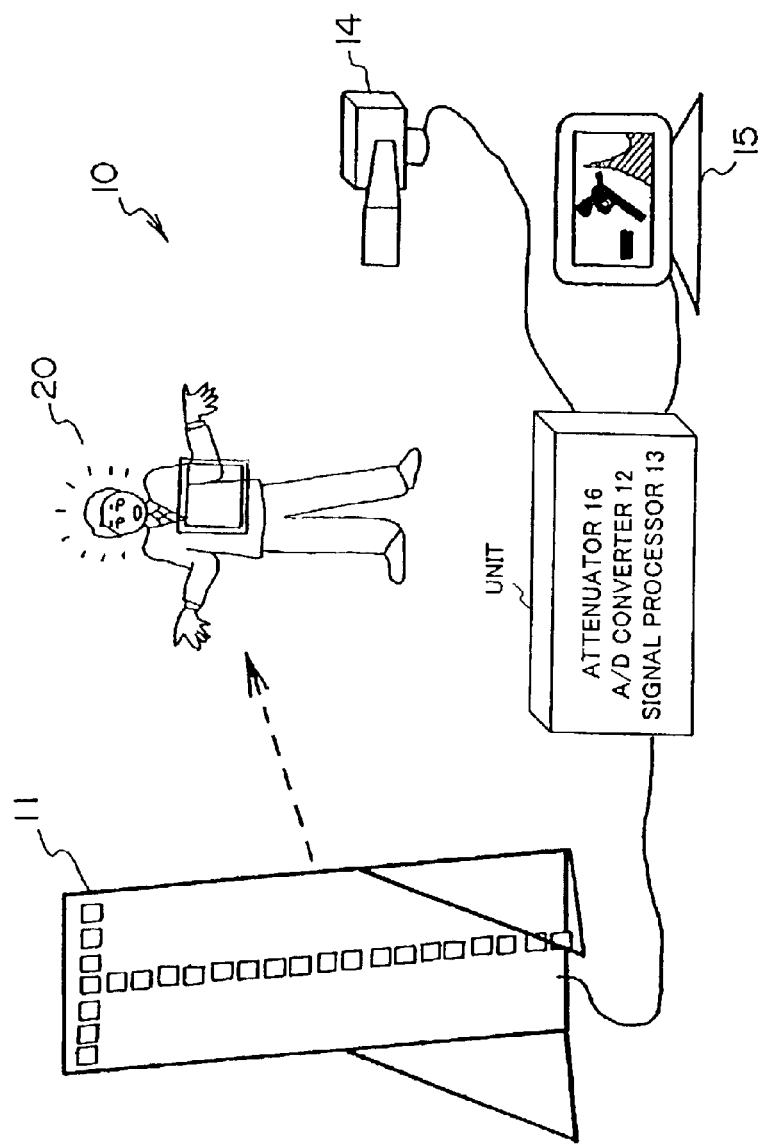
FIG. 1 shows the basic constitution concerning radar system, method of obtaining images, control method based on image data and monitoring method using milliwaves embodying the present invention.

FIG. 1 shows the basic constitution concerning radar system, method of obtaining images, control method based on image data and monitoring method using milliwaves embodying the present invention. Particularly, the Figure illustrates an application of the present invention to a radar system. The radar system generally designated at 10 comprises a two-dimensional plane antenna 11, an A/D (analog-to-digital) converter 12, a signal processor 13, a calibration signal source 14, a monitor (or image display) 15 and an attenuator 16. In FIG. 1, the A/D converter 12, the signal processor 13 and the attenuator 16 together constitute and are provided as a unit.

The two-dimensional plane antenna 11 is constituted by a plurality of sub-antennas, and it receives milliwaves generated from a target (or concerned object) such as a person's body. The A/D converter 12 digitalizes signal passed through the attenuator 16. The signal processor 13 executes two-dimensional FFT (i.e., Fast Fourier Transform) in a phase processing on the received data. The monitor 15 displays the processed signal as image data. The signal processor 13 cancels phase error components, which arise due to adverse effects of the receiver position and bending or elongation of cables and pose problems in the case of using, for instance, 94-GHz band high frequencies, with a signal outputted from the associated calibration signal source 14 to obtain highly accurate images.

Figure 2:
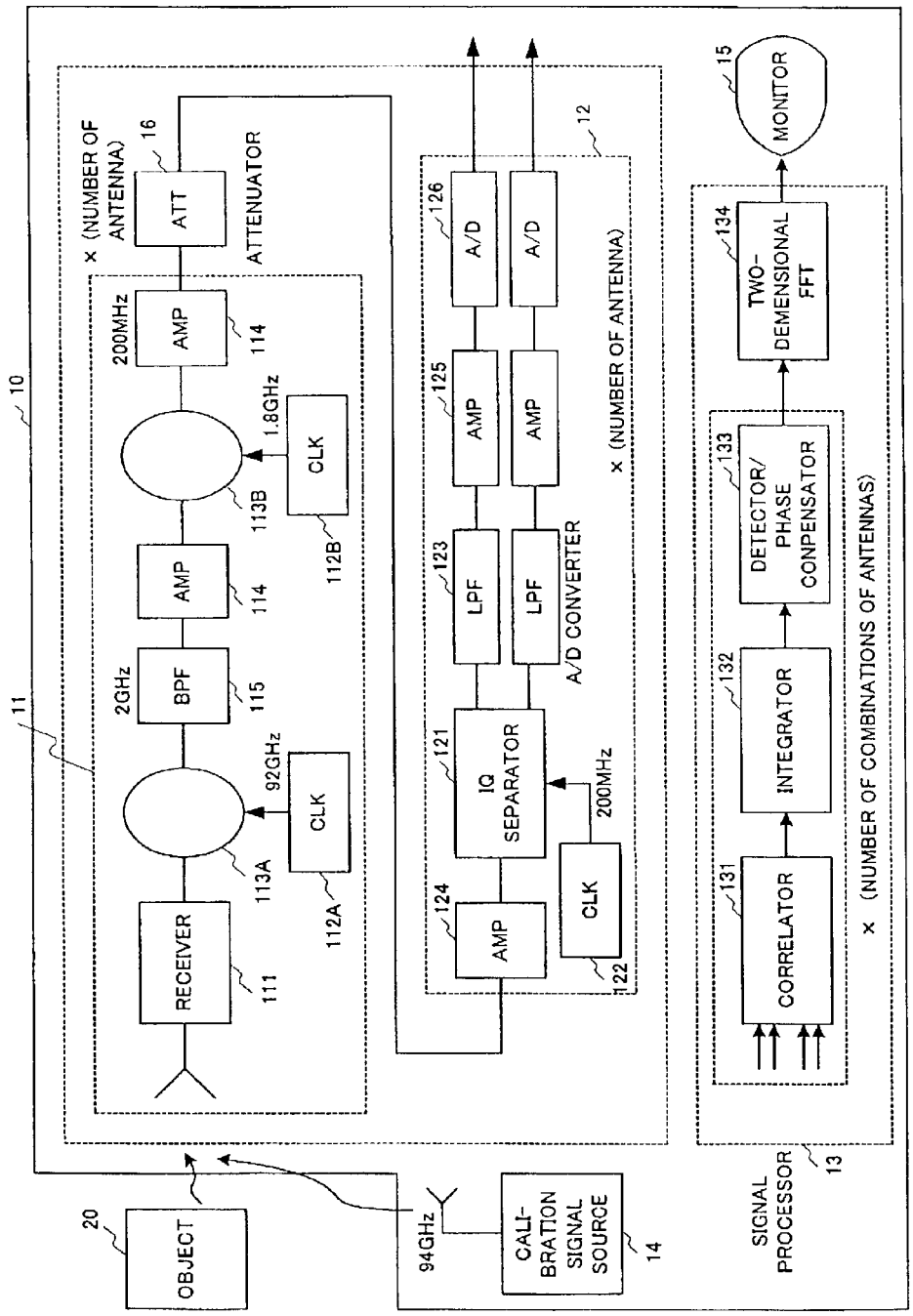
FIG. 2 is a block diagram showing detailed construction of a preferred embodiment of the radar system 10 shown in FIG. 1 according to the present invention.

FIG. 2 is a block diagram showing detailed construction of a preferred embodiment of the radar system 10 shown in FIG. 1 according to the present invention. The two-dimensional plane antenna 11 includes a receiver 111, a pair of reference clock (CLK) generators 112A and 112B, a pair of down-converters 113A and 113B, a band-pass filter (BPF) 115 and a pair of amplifiers (AMP) 114. The A/D converter 12 includes a CLK generator 122, an AMP 124, an I/Q component separation processor 121, and pluralities of low-pass filters (LPF) 123, AMPs 125 and A/D converters 126. The signal processor 13 includes a correlator 131, an integrator 132, a compensation detector/phase compensator 133 and a two-dimensional FFT (or calculator) 134.

In the signal processor 13, the correlator 131 calculates correlations among the plurality of sub-antennas constituting the two-dimensional plane antenna 11. The integrator 132 integrates the correlation data from the correlator 131. The compensation detector/phase compensator 133 executes phase compensation based on the calibration data. The two-dimensional FFT 134 is a calculator for executing an image generation process with two-dimensional FFT.

In the two-dimensional antenna 11, the receiver 111 receives milliwaves from concerned object 20 such as a person's body. The CLK generator 112 generates a reference clock signal. The down-converters 113A and 113B down-convert the frequency of milliwaves received in the receiver 111. The AMPs 114 amplify the down-converted signals from the down-converters 113A and 113B. The BPF 115 takes out desired signal from the down-converted signal from the down-converter 113A. It will be seen that the frequency of the received signal is down-converted a plurality of times by a plurality of down-converters 113A and 113B for obtaining necessary process frequency band data.

In the A/D converter 12, the I/Q component separation processor 121 executes the separation of the I and Q components from the received signal with the reference clock signal from the CLK generator 122. The CLK generator 122 generates the reference clock signal noted above. The LPFs 123 selectively pass only low frequency components of the output signal from the I/Q separation processor 121. The AMPs 124 and 125 amplify input signals with predetermined amplification degrees. The A/D converters 126 executes the conversion of input signals to digital data.

From the receiving antenna 11 up to the A/D converter 12, it is preferable to prepare a plurality of systems corresponding in number to that of sub-antennas of the receiving antenna 11. In the radar system 10, the CLK generators 112A, 112B and 112 are phase-matched by using a common transmission source. From the correlator 131 up to the phase compensator 133, it is also preferable to prepare systems corresponding in number to that of combinations of the receiving antenna 11.

The operation of the radar system shown in FIGS. 1 and 2 will now be described. Prior to the measurement, the calibration signal source 14 generates calibration data. In the two-dimensional plane antenna 11, each sub-antenna receives data and the received data is calibrated. At the time of the calibration, for correct phase measurement the calibration signal source 14 generates a calibration signal having a sufficiently high intensity with respect to ambient milliwave sources. To this end, the attenuator 16 capable of reducing the circuit gain, is assembled between the receiving antenna 11 and the A/D converter 12, for obtaining the data at the calibration time.

The received data by each sub-antenna in the two-dimensional plane antenna 11 is subjected to substantially the same process as the usual observation. The correct position relation between each sub-antenna and transmitter and the values of the correlations among the sub-antennas are recorded as calibration data. By frequently executing such calibration, it is possible to suppress the phase deviations due to temperature changes or like causes and obtain highly accurate images at all times. After the calibration, the transmission of the calibration data from the calibration signal source 14 is stopped, and the circuit gain in the attenuator 16 is increased to the observation level for passively observing milliwaves emitted from the concerned object 20.

The CLK generators 112A and 112B and the down-converters 113A and 113B down-convert (i.e., frequency reduce) the received data by each sub-antenna in the two-dimensional receiving antenna 11. The BPF 115 filters the down-converted data in a process subject range. The AMPs 114 amplify the input signals to necessary levels. Usually, the process is executed in a plurality of stages. The data obtained as a result of down-conversion to the process subject frequency band, is supplied to the A/D converter 12. In the A/D converter 12, the I/Q component separation processor 121 executes the separation of the I and Q components, which are supplied through the low-pass filters 123 and the AMPs 125 to the A/D converters 126 for conversion to digital data.

Subsequently in the signal processor 13, the correlator 131 executes inter-antenna correlation of the digitalized data from the plurality of sub-antennas. The integrator 132 integrates the input data for improving the S/N ratio. The compensation detector/phase compensator 133 compensates the integration results from the integrator 132 by using the calibration data obtained in a calibration process using the calibration signal source 14 noted above. Calibration result data are inserted in a two-dimensional relative sub-antenna position array, and the two-dimensional FFT (or calculator) executes two-dimensional FFT on the resultant two-dimensional array. In this way, it is possible to obtain the image of the concerned object 20. In the case of disposing the two-dimensional receiving antenna plane-wise and using correlators 131 corresponding in number to the number of correlations, no beam scanning is necessary, and it is thus possible to fastly obtain motion picture images.

Figure 3:
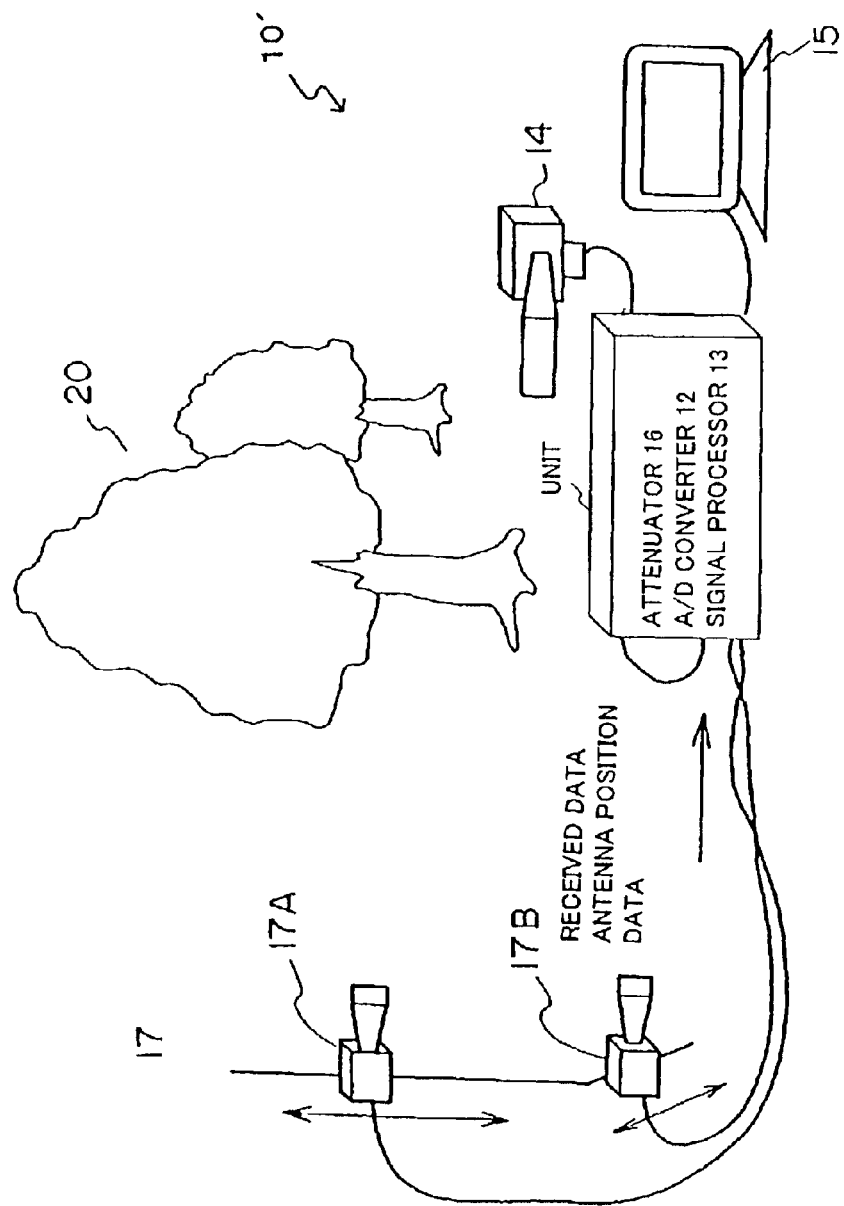
FIG. 3 shows the constitution of a second embodiment of the radar system according to the present invention.

FIG. 3 shows the constitution of a second embodiment of the radar system according to the present invention. In this radar system 10', mobile antennas are used as receiving antenna in lieu of the two-dimensional plane antenna 11 in the radar system 10 described above. More specifically, two receiving antennas, i.e., vertical receiving antenna 17A which is vertically movable and a lateral receiving antenna 17B which is laterally movable, are provided such that they are movable by respective drive means. These receiving antennas 17A and 17B are movable along rails to change their positions as desired. For the movement and position detection, servo motors are used, and their data are inputted to calculator in the signal processor 13. In this case, the observation is continued by causing calibration whenever the receiving antennas 17A and 17B are change in position. Finally, correlator execute two-dimensional FFT on correlation data to obtain images.

It will be seen that the radar system 10' permits, by after-process, obtaining equivalently the same data as in the case of using the two-dimensional plane antenna 11. This radar system 10' requires calibration and observation whenever the receiving antennas 17A and 17B are moved, and therefore it is not suited for obtaining moving images. However, in the case when the concerned object 20 is stationary, only two receiving antennas and correlators are needed, and it is thus possible to construct the radar system 10' inexpensively. The disposition angle between the rails of the two receiving antennas 17A and 17B in the radar system 10' need not be 90 degrees, and it is possible to dispose the two rails at a desired angle therebetween for processing based on position data corresponding to the disposition angle.

As in above, the constitution and operation of a preferred embodiment of radar system, method of obtaining images, control method based on image data and monitoring method using milliwaves have been described in details. This embodiment, however, is given merely exemplarily without any sense of limiting the present invention. A person skilled in the art will readily understand that various changes and modifications are possible in dependence on specific purposes. For example, since the process after the A/D conversion is executed digitally, it is possible to replace correlators or the like with computer programs. It is also possible to replace the monitor 15 with control by directly inputting image data obtained in the radar system 10 to various control systems.

As has been described in the foregoing, with the radar system, method of obtaining images, control method based on image data and monitoring method using milliwaves according to the present invention, the following pronounced practical effects are obtainable. It is possible to obtain clear images with a passive system, which uses, for instance, heretofore difficult 94-GHz band high frequency milliwaves. Thus, as close distance range application, the present invention is applicable to a detector for detecting arms or the like concealed by a person who is at a security gate of an airport or the like for getting on board. As remote distance application, because of less susceptibility to weather or like natural conditions compared to the case of infrared rays, the present invention is applicable to vehicle monitoring systems or the like. In either case, the sensor operates passively, and it is thus possible to obtain a particular effect that the monitored side can not recognize to be being monitored.

Furthermore, in the radar system, method of obtaining images, control method based on image data and monitoring system using milliwaves, by using as receiving antenna two mobile receiving antennas movable in different directions, for instance, it is possible to inexpensively realize a radar system sutiable for monitoring still objects.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. Radar system for displaying images of a concerned object on a monitor or the like by receiving milliwaves emitted from the concerned object comprising:

a calibration signal source for generating milliwave calibration signal signals during a calibration period;

a transmitter for transmitting said milliwave calibration signals during said calibration period;

a receiving antenna having an effectively two-dimensional receiving antenna function, said receiving antenna receiving said calibration signals during said calibration period and passively receiving milliwave received signals; and a signal processor for compensation a processing said passively received milliwave received signals from the concerned object, said compensating processing based on the calibration signals received by the receiving antenna during said calibration period.

2. The radar system according to claim 1, wherein the compensation processing in the signal processor executes phase compensation based on a phase relation between the passively received milliwave received signals from the concerned object and the calibration signals.

3. The radar system according to claim 1, wherein the receiving antenna is a two-dimensional plane antenna having a plurality of sub-antennas.

4. The radar system according to claim 1, wherein the receiving antenna comprises two mobile receiving antennas movable in different directions.

5. The radar system according to claim 3, which further comprises an analog-to-digital converter for converting signals received form the sub-antennas of the effectively two-dimensional receiving antenna in the receiving antenna to digital data, the signal processor including a correlator for obtaining correlations of the digital data and a two-dimensional FFT for executing Fourier transform of the correlations.

6. The radar system according to claim 1, wherein the calibration signals have a relatively high intensity level compared to said passively receiving milliwave received signals from the concerned object so that the passively receiving a milliwave received signals are negligible compared to said calibration signals.

7. The radar system according to claim 1, wherein the concerned object comprises a person's body.

8. A method of obtaining images of a target object in a radar apparatus having a plurality of antennas by obtaining image data thereof by receiving milliwaves emitted therefrom, comprising the steps of:

calibrating said radar apparatus by:
      transmitting milliwave calibration signals to said target object during a calibration period;
      receiving calibration signals reflected from said target object and processing same for obtaining correlation data of said plurality of antennas;

imaging said target object by:
      passively receiving milliwave signals from the target object from said plurality of antennas; and
      compensating processing said passively received milliwave signals based on said received calibration signals thereby obtaining image data of the target object.

9. The radar system according to claim 8, wherein the compensation processing executes phase compensation based on a phase relation between the passively received milliwave signals target object and the received calibration signals.

10. The radar system according to claim 8, wherein the received calibration signals have relatively high intensity level compared to said passively received milliwave signals from the target so that the passively receiving a milliwave received signals are negligible compared to said calibration signals.

11. The radar system according to claim 8, wherein the target object comprises a person's body.

12. A control method comprising the steps of:

compensation processing a passively received milliwave signal emitted from a target object and received by a receiving antenna, said receiving antenna effectively having a two-dimensional receiving antenna function, said compensation processing including a phase compensation based on a phase relationship between a predetermined milliwave calibration signal transmitted to said target object and received from the target object at the time of calibration and said passively received milliwave signal, thereby obtaining image data of the target object; and executing predetermined control according to the obtained image data.

13. The radar system according to one of claim 12, wherein the calibration signal has a sufficiently high intensity level compared to said passively received milliwave signal from the target so that the passively receiving a milliwave signal is negligible compared to said calibration signal.

14. The radar system according to claim 12, wherein the target object comprises a person's body.

15. A method for monitoring a target object using milliwaves, comprising the steps of:

receiving a milliwave signal from the target object by utilizing a receiving antenna;

compensation processing the received milliwave signal, said compensation processing including a phase compensation based on a phase relationship between milliwave calibration signal received by the receiving antenna and said received milliwave signal to obtain image data of the concerned object, monitoring the target object based on the obtained image data.

16. The radar system according to claim 15, wherein the calibration signal has a relatively high intensity level compared to said received milliwave signal from the target object so that the received milliwave signals is negligible compared to said calibration signal.

17. The radar system according to claim 15, wherein the target object comprises a person's body.

* * * * *